(12) United States Patent
Coulombe et al.

(10) Patent No.: US 6,771,807 B2
(45) Date of Patent: Aug. 3, 2004

(54) METHOD AND SYSTEM FOR DETECTING DEFECTS ON A PRINTED CIRCUIT BOARD

(75) Inventors: Alain Coulombe, Brossard (CA); Michel Cantin, Brossard (CA); Louis Bérard, Montreal (CA); Jonathan Gauthier, Ste-Julie (CA)

(73) Assignee: Solvision Inc., Brossard (CA)

( * ) Notice: Subject to any disclaimer, the term of this patent is extended or adjusted under 35 U.S.C. 154(b) by 693 days.

(21) Appl. No.: 09/764,745

(22) Filed: Jan. 18, 2001

(65) Prior Publication Data

US 2001/0028732 A1 Oct. 11, 2001

(30) Foreign Application Priority Data

Jan. 18, 2000 (CA) .............................................. 2296143

(51) Int. Cl.$^7$ ................................................ G06K 9/00
(52) U.S. Cl. ...................................... 382/149; 382/147
(58) Field of Search ........................ 382/141, 143–152; 348/86, 87, 125, 126; 700/95, 96, 97, 117, 121

(56) References Cited

U.S. PATENT DOCUMENTS

| | | | |
|---|---|---|---|
| 4,570,180 A | 2/1986 | Baier et al. | |
| 4,578,810 A | 3/1986 | MacFarlane et al. | |
| 4,589,140 A | 5/1986 | Bishop et al. | |
| 4,654,583 A | 3/1987 | Ninomiya et al. | |
| 4,776,022 A | 10/1988 | Fox et al. | |
| 4,791,586 A | 12/1988 | Maeda et al. | |
| 4,799,175 A | 1/1989 | Sano et al. | |
| 4,894,790 A | 1/1990 | Yotsuya et al. | |
| 4,974,261 A | 11/1990 | Nakahara et al. | |
| 5,054,094 A | * 10/1991 | Barski ........................ | 382/192 |
| 5,086,477 A | 2/1992 | Yu et al. | |
| 5,115,475 A | 5/1992 | Lebeau | |
| 5,119,434 A | 6/1992 | Bishop et al. | |
| 5,272,763 A | * 12/1993 | Maruyama et al. ......... | 382/147 |
| 5,365,596 A | 11/1994 | Dante et al. | |
| 5,452,368 A | 9/1995 | LeBeau | |
| 5,455,870 A | * 10/1995 | Sepai et al. ................. | 382/147 |
| 5,483,603 A | 1/1996 | Luke et al. | |
| 5,506,793 A | * 4/1996 | Straayer et al. ............... | 702/85 |
| 5,586,058 A | 12/1996 | Aloni et al. | |
| 5,608,453 A | 3/1997 | Gerber et al. | |
| 5,751,910 A | * 5/1998 | Bryant et al. .................. | 706/2 |
| 5,774,572 A | 6/1998 | Caspi | |
| 5,848,189 A | 12/1998 | Pearson et al. | |

OTHER PUBLICATIONS

Automatic detection of three dimensional solder defects using a brightness based approach, by Berard, et al. IEEE, 1992.*

* cited by examiner

*Primary Examiner*—Vikkram Bali
(74) *Attorney, Agent, or Firm*—Merchant & Gould P.C.

(57) ABSTRACT

A method and a system for detecting surface defects on electronic circuits, such as Printed Circuit Boards (PCB), are described herein. The method first comprises identifying contours on a digital image of the PCB. Then anomalies are detected on the PCB image by comparing the identified contours to contours on a vectorial model of the PCB. Each detected anomaly is compared to manufacturing data to verify if it corresponds to a defect.

17 Claims, 16 Drawing Sheets

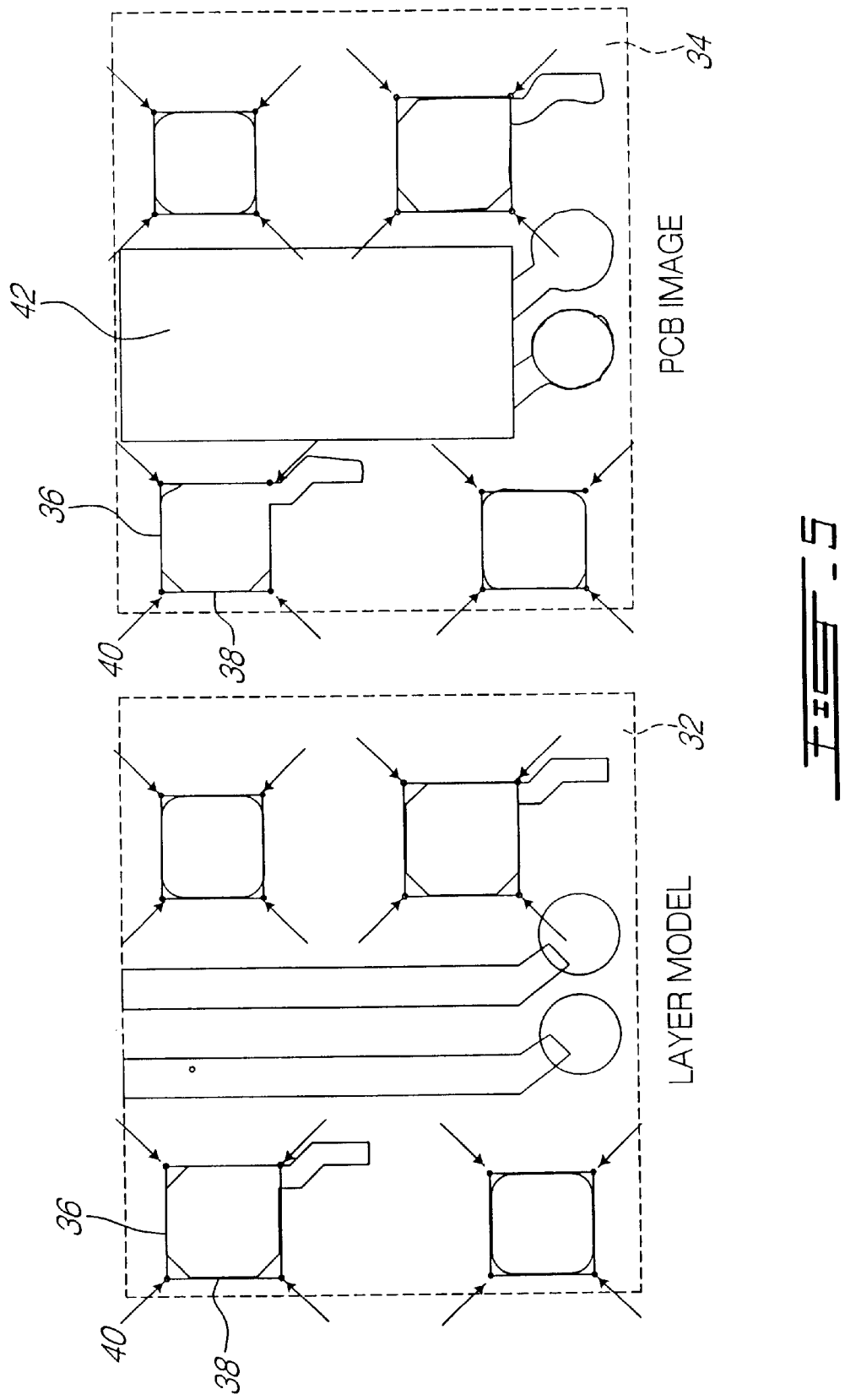

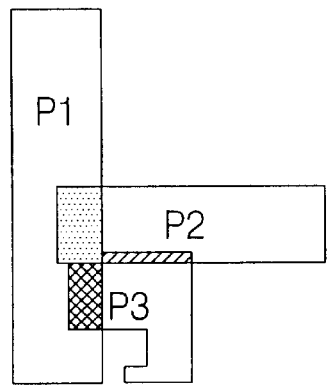
FIG. 6a
Pv1 = P1 - P2 - P3
Pv2 = P2 - P3
Pv3 = P3
FIG. 6b
 O21 = (P1 ∧ P2) - P3
 O31 = P3 ∧ Pv1
 O32 = P3 ∧ P2
FIG. 6c

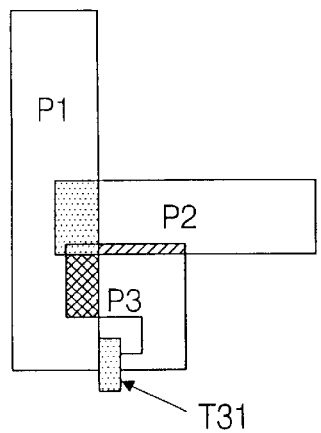
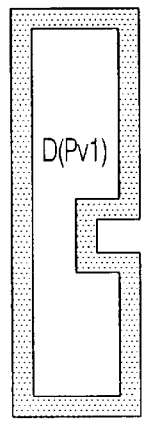
FIG. 7a
FIG. 7b
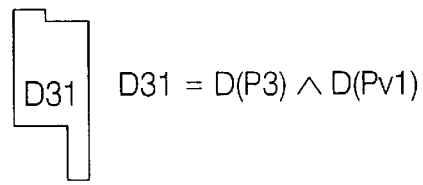
D31 = D(P3) ∧ D(Pv1)
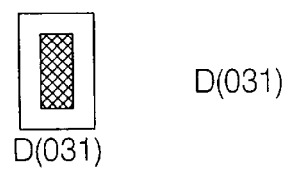
D(O31)
T31 = D31 − D(O31)
FIG. 7c

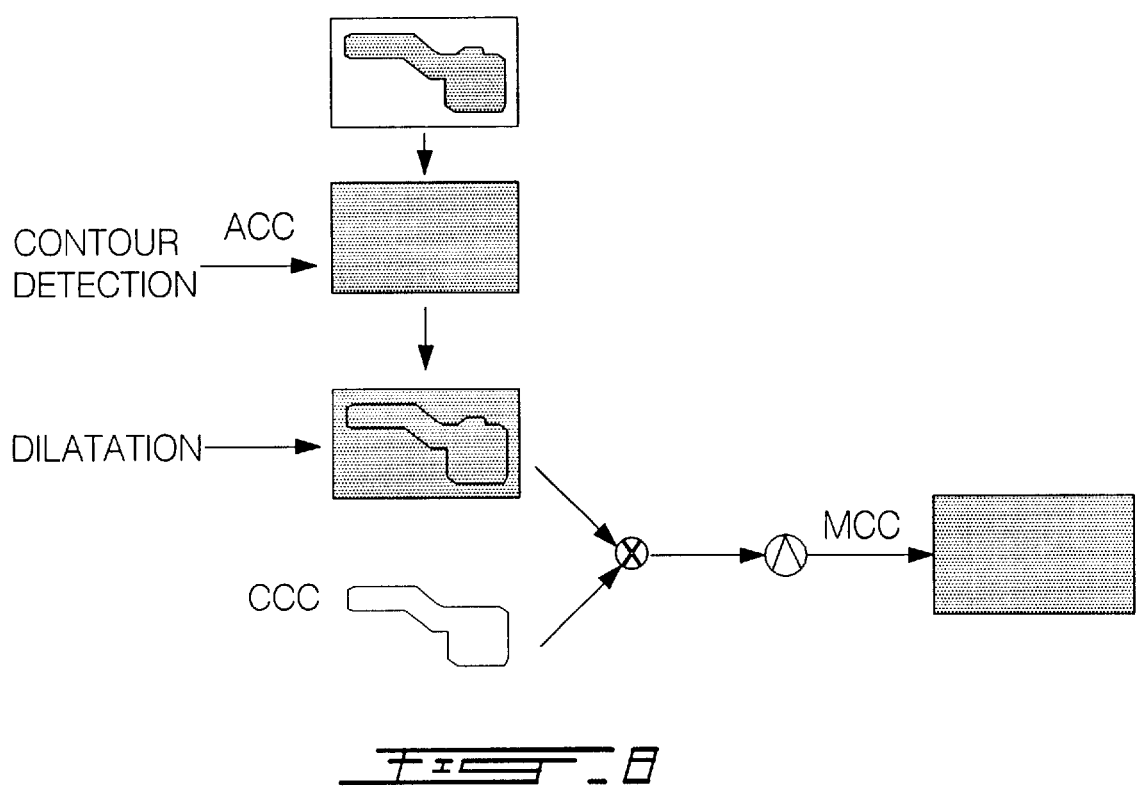

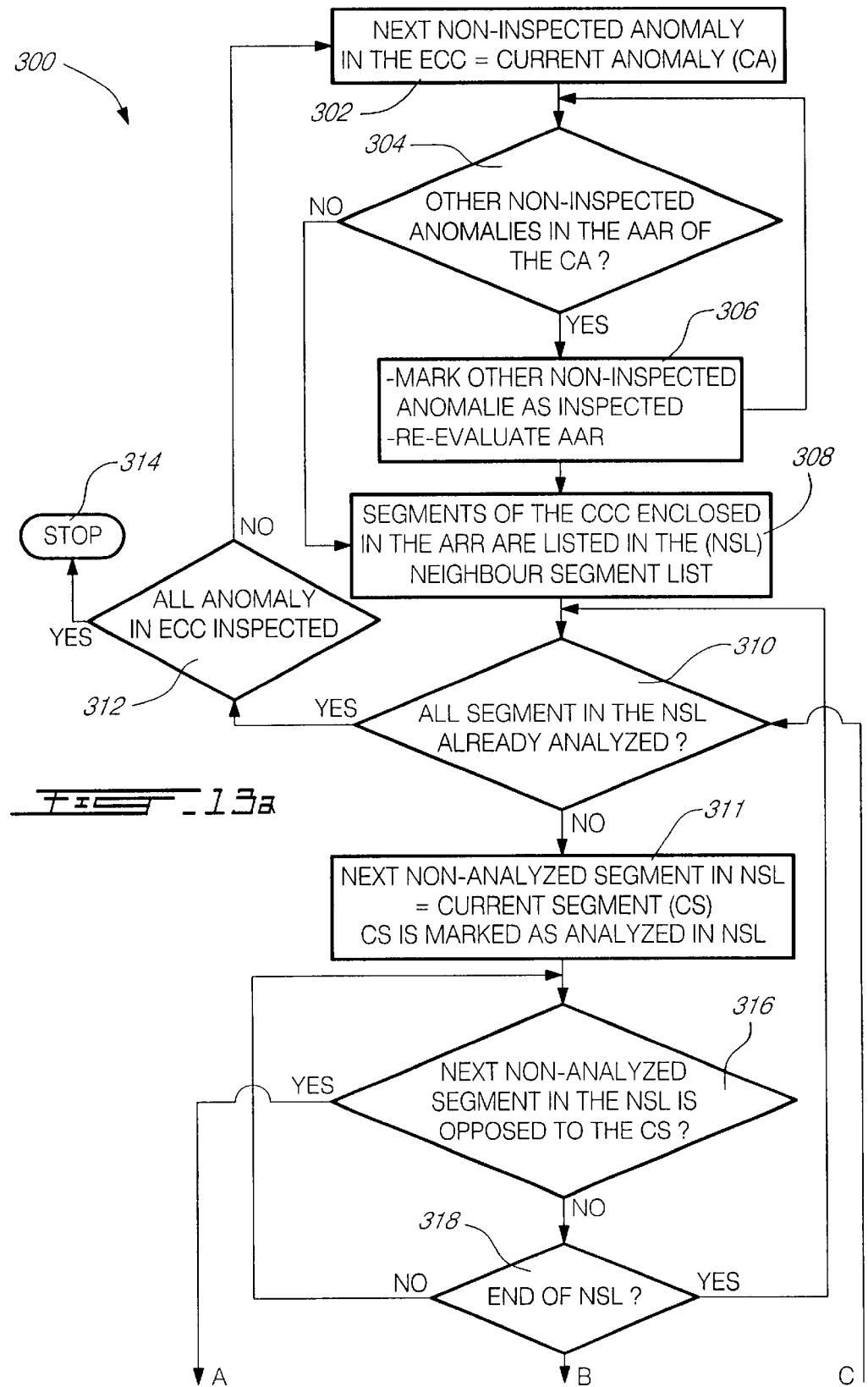

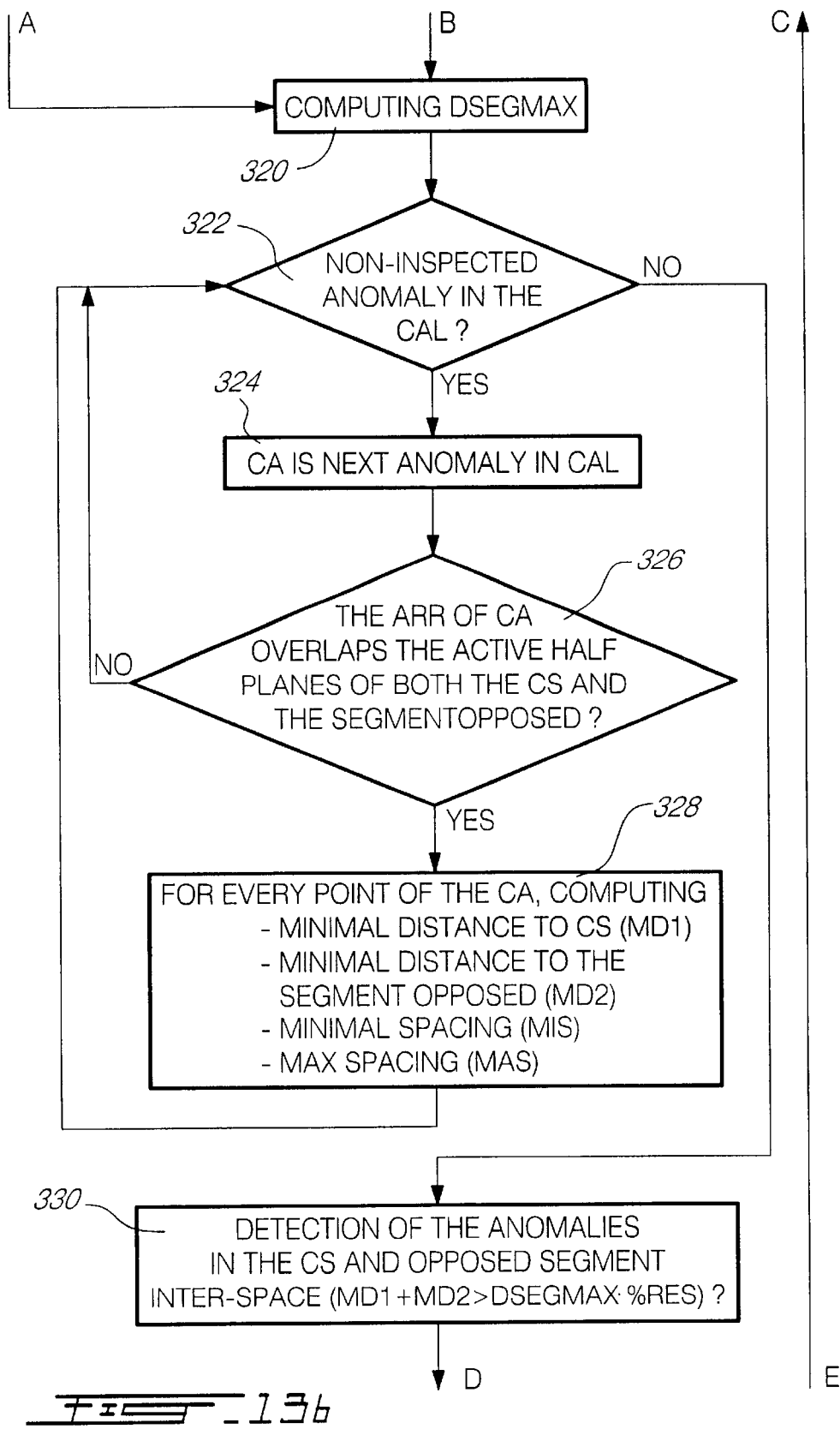

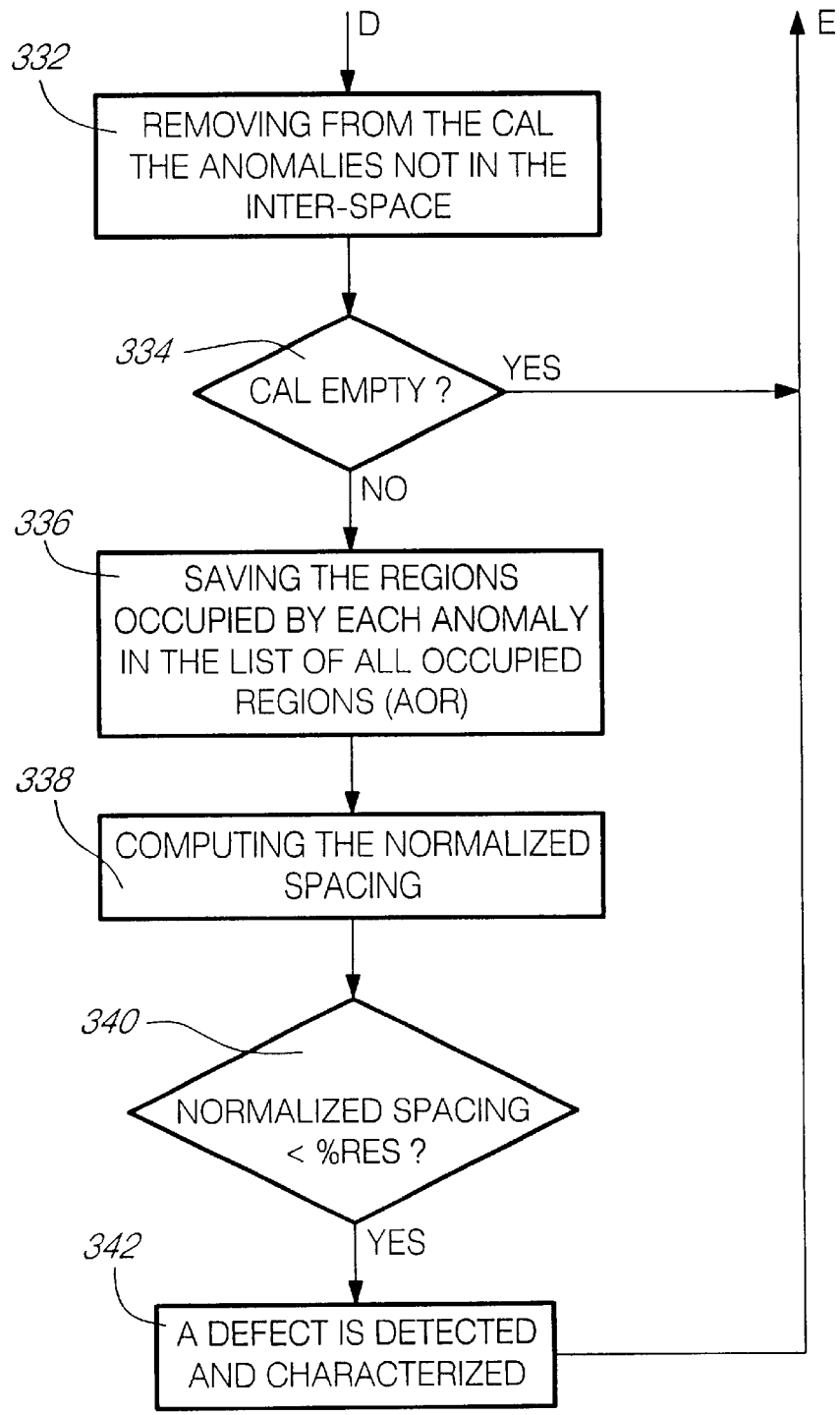

METHOD AND SYSTEM FOR DETECTING DEFECTS ON A PRINTED CIRCUIT BOARD

FIELD OF THE INVENTION

The present invention relates to inspection systems and to methods for detecting defects on electronic circuits such as printed circuit boards. More specifically, the present invention is concerned with such systems and methods based on edge detection.

BACKGROUND OF THE INVENTION

Electronic circuits may take many forms, such as PCB (Printed Circuit Boards), lead frames, and hybrid circuits. These circuits usually include a plurality of components, for example conductors, holes, pads, dielectrics, photopolymer resist film, etc. These components may be assembled on layers that are mounted on top of each other. An example of such multi-layer assembly is the well-known conductors-holes-glaze circuit structure. In the following description we will refer to printed circuit boards (PCB) only as an example. However, it is to be understood that the present invention is not limited to that embodiment of electronic circuits.

In the past, inspection of PCBs has been performed visually by a person who would have looked at a circuit, using a magnifier, trying to find differences with an acceptable circuit model. Drawbacks of visual inspections are numerous: subjectivity, slowness, difficulty to collect quantitative information on defects, etc.

Automated methods of inspection have recently emerged following the increase of computer processing speed. Most of those automated methods consist in taking a digital image of the PCB to be inspected and analyzing this digital image to determine the presence of defects. Examples of such automated methods are those based on the detection of edges.

An edge is a segment of a component's contour. It can be visually distinguished on a digital image as variations of hue from one component to the next, assuming that transitions between components (or regions) have optically different characteristics. Edge based detection methods consist in characterizing and analyzing edges on a PCB image and by comparing such edges to known values and criteria.

FIG. 1 of the appended drawings illustrates examples of defects that can be found on a PCB or on other types of electronic circuits. The defects may be, for example, a bad overlap 10 between two layers of the PCB, a misalignment of two layers 12, a gap too small 14 between two adjacent tracks, a bridge 16 between two components, a track too narrow 18 or a broken track 19.

An example of an edge-based method for detecting defects on an electronic circuit is described in U.S. Pat. No. 4,570,180, untitled "Method For Automatic Optical Inspection", issued on Feb. 11, 1986 and naming Baier et al. as inventors. This patent relates to a method and an apparatus for automatic optical inspection of a substantially two-dimensional pattern using digital image processing techniques. The method includes a first step in which grey level digital images are scanned for edges or lines and marking those edges in image storage. Then all non-marked regions in the image storage are scanned and tested for permissible grey levels.

Since anomalies are tested only by comparing non-marked regions to permissible grey levels, a drawback of Baier's method is that the quality of the detection is too dependent on the quality of the digital images. Indeed, the digitized image of an object may present variation in feature sizes and locations depending on the digitizing algorithms, magnification differences, etc.

Another problem of Baier's method is that, approximately the same computing power is required to test all pixels on the digital picture that do not correspond to edges, leading to waste of both computing resources and time.

Still another drawback of Baier's method is that it can be difficult to characterize a detected defect. Such characterization can be useful to find emerging error patterns in the electronic circuit's manufacturing process.

In U.S. Pat. No. 5,452,368 issued on Sep. 19, 1995 and entitled "Method of Detecting Defects In Semiconductor Package Leads", LeBeau teaches a method for detecting defects in objects by comparing a first grey level image of a first object to a second grey level image of a second object. More precisely, the edge features of the first image are skeletonized and compared to the dilated edge features of the second image and vice versa. Contrary to Baier's method, LeBeau's does not test non-edge-related regions on the digital image.

However, a drawback of LeBeau's method is that defects are searched by comparing two images of objects that can be inflected by very similar defects positioned at about the same place. LeBeau's method does not allow for detection of such defects. This is a major drawback since a faulty manufacturing process can cause such repeated defects.

Accordingly, it is desirable to have a method and a system that allows for the detection of defects on an electronic circuit that does not rely on the quality and resolution of the digitized image of the electronic circuit and that does not interpret grey level variations as defects.

It is also desirable to have a method and a system to detect defects that make use of design data.

It is further desirable to have such methods and systems that provide two levels of inspection, one to detect anomalies and another to inspect these anomalies for defects, helping maximize the processing speed.

SUMMARY OF THE INVENTION

More specifically, in accordance with the present invention, there is provided a method for detecting surface defects on a Printed Circuit Board (PCB) having at least one layer including components, the method comprising:

providing a digital image of the PCB;
identifying edges on the PCB image;
providing a corresponding computer model for each component on at least one layer of the PCB;
detecting anomalies on the PCB image by comparing said identified edges to the computer model; and
for each detected anomalies, determining if the detected anomaly corresponds to a surface defect.

According to another aspect of the present invention, there is provided a system for detecting surface defects on a PCB; the system comprising:

a computer including a model of the PCB and being configured to identify edges on a PCB images, detecting anomalies on the PCB image by comparing the identified edges to the computer model, and for each detected anomaly, determining if the detected anomaly corresponds to a surface defect;

an illumination assembly connected to the computer to provide illumination on the PCB;

a frame grabber connected to the computer;

a camera connected to the frame grabber to take an image of the PCB; and a positioning system connected to the frame grabber.

It is to be noted that the term "PCB" should be construed herein as any electronic circuit that may include visually distinguishable surface defects.

Other objects, advantages and features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 5 is a schematic view of both images of the PCB and of a computer model therefrom, illustrating the selection of reference points for their alignment;

FIG. 6a is a schematic view of superimposed polygons from a three layer model of a PCB;

FIG. 6b is a schematic view of the polygons of FIG. 6a after subtraction of the following layers;

FIG. 6c is a schematic view of the intersections of the polygons of FIG. 6a;

FIG. 7a is a schematic view of the polygons of FIG. 6a, illustrating a narrow region;

FIG. 7b is a schematic view of the polygons of P1 and P3 from FIG. 7a, after dilatation;

FIG. 7c is a schematic view of the results of the superimposition of the polygons of FIG. 7a;

FIG. 8 is a schematic view illustrating the detection of missing contours on a region of a PCB;

FIGS. 13a, 13b and 13c are a flow chart of a method to determine if an anomaly violates the allowed width or spacing;

DESCRIPTION OF THE PREFERRED EMBODIMENT

Generally stated, a method for detecting surface defects on a PCB according to embodiments of the present invention includes 1) identifying the edges on a digital image of the PCB, 2) detecting anomalies by comparing the identified edges to a computer model of the PCB and 3) determining if the detected anomalies correspond to a surface defect by a characterization of each anomaly.

A method according to the present invention therefore presents two levels of inspection: a first level that allows to rapidly identify anomalies and which requires relatively little computing time, and a second level, more refined, that compares identified anomalies to design specifications so as to characterize detected defects.

To implement the method, a digital image of the inspected PCB and a computer model of a similar PCB must be provided.

Figure 1:
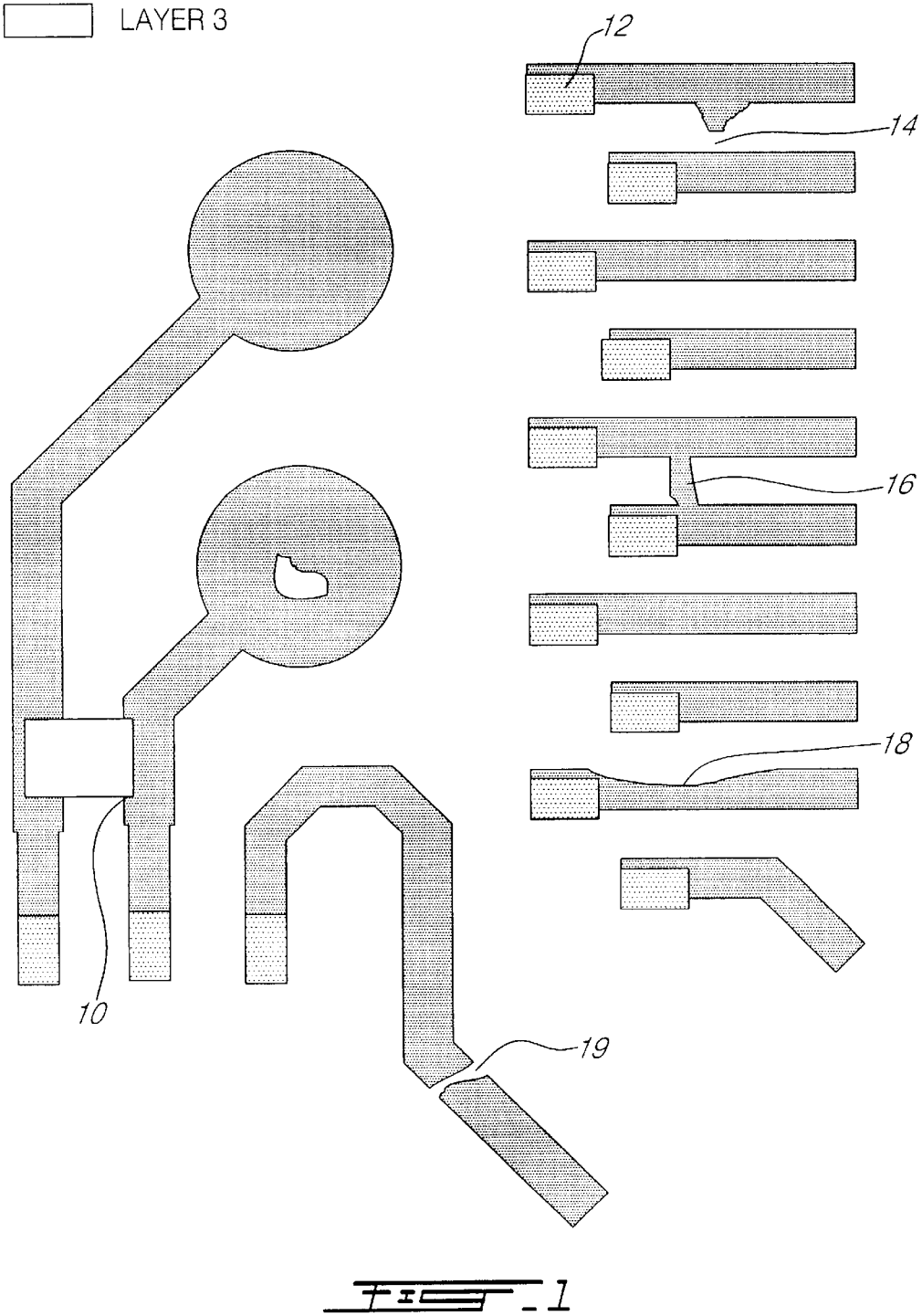
FIG. 1, is schematic view illustrating examples of defects on a printed circuit board (PCB)
Figure 2:
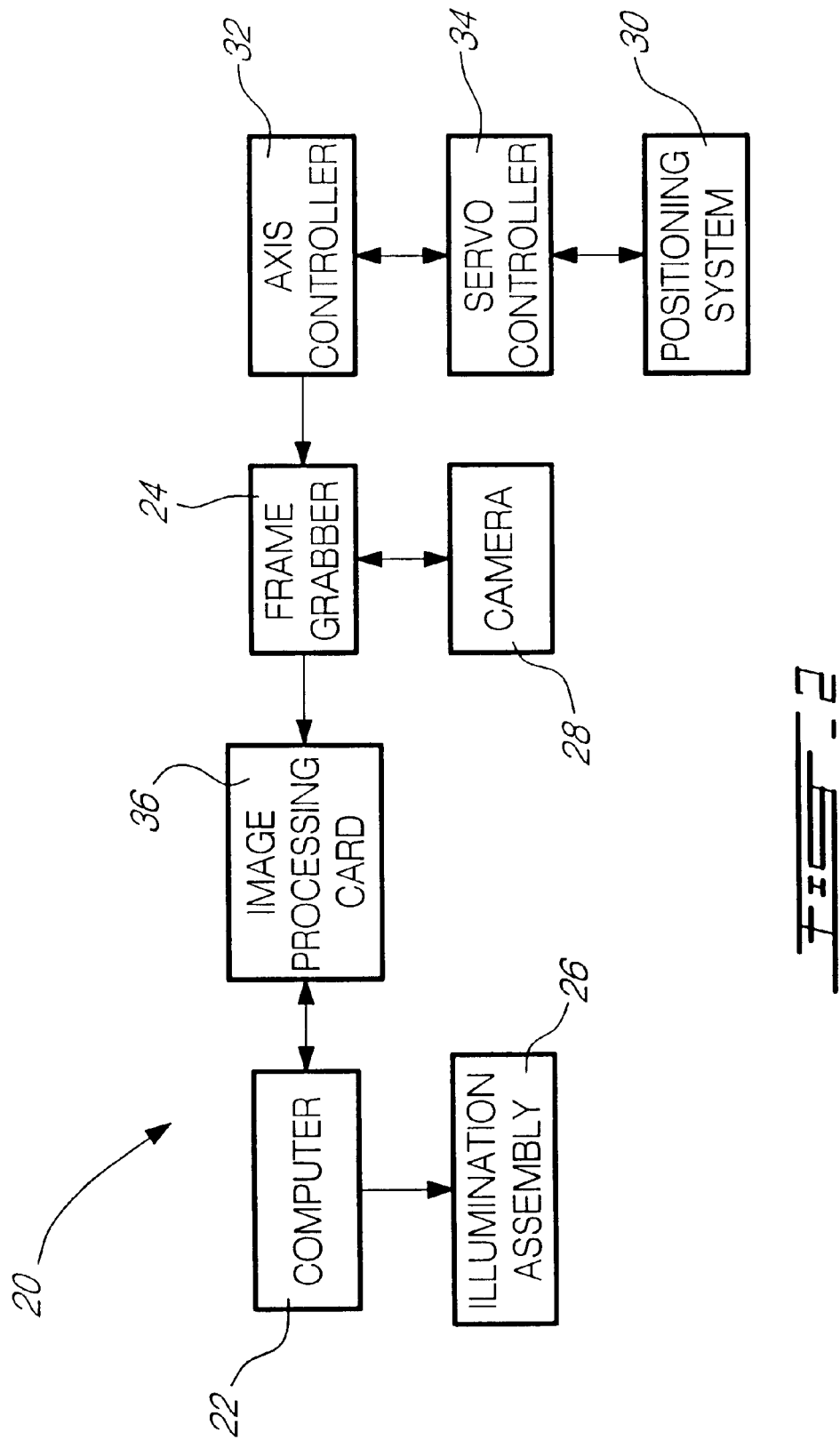
FIG. 2 is a block diagram of a system for detecting surface defects on a PCB according to an embodiment of the present invention.

Referring to FIG. 2 of the appended drawings, a system 20 for detecting surface defects on a PCB, according to an embodiment of the present invention, will be described.

Generally stated, the system 20 allows to gather an image of a PCB under inspection and to detect possible defects using a method according to the present invention, as will be described hereinbelow in more detail.

The system 20 comprises a computer 22, a frame grabber 24 and an illumination assembly 26, both connected to the computer 22, a camera 28, connected to the frame grabber 24 and a positioning system 30, connected to the frame grabber 24 via an axis controller 32 and a servo controller 34.

The computer 22 is advantageously in the form of a personal computer that is so configured as to store both the image taken by the camera 28 of the PCB to be inspected and a computer model of a similar PCB. The computer 22 is also advantageously programmed so as to control the illumination assembly 26 and to do the computations required to analyze the image and, using a method according to the present invention, assess whether the PCB under inspection includes surface defects.

The illumination assembly 26 allows the regulation of the light intensity on the PCB under inspection.

The frame grabber 24 is in the form of a card that interfaces the camera 28 and the computer 22. The frame grabber 24 can advantageously operate in either one of two modes. According to a first mode, the frame grabber 24 captures an image line by line, and sends each line to the computer 22. In a second mode, the frame grabber 24 captures a full image of the PCB at once before sending the image to the computer 22.

An optional conventional image-processing card 36 advantageously interfaces the frame grabber 24 and the computer 22 and allows faster processing of the image taken by the camera 28. When the card 36 is not included, the computer 22 is configured to process the image.

The camera 28 allows digital images of PCBs to be taken. The camera 28 is advantageously in the form of a CCD (Charge-Coupled Device) camera that may operate in linear or in matrix mode. The resolution of the camera 28 may vary according to the nature of the PCB to be inspected and the precision required.

The use of a linear CCD camera requires that the positioning system 30 scan the PCB in the direction perpendicular to its pixels. However the resolution obtained in the perpendicular direction may be practically infinite. Its line resolution is about 8000 pixels.

Matrix CCD cameras have a resolution of about 4000×4000 pixels. The use of such cameras is advantageous in sparse regions of a PCB. In this case, the positioning system 30 may be configured so as to move from region to region.

The positioning system 30 includes axles and servomotors (not shown) that allow the movement of supports on which the PCB lies.

The axis controller 32 allows synchronizing the motion of the positioning system 30 with the requirements of the inspection system 20.

The servo controller 34 controls the positioning system 30 and the retroactive loop that regulates the amplitude of the power current required to energize the electric motors (not shown) of the positioning system 20.

Since frame grabbers, servo controllers, positioning systems and CCD cameras are believed to be well known in the art, they will not be described herein in further detail.

Of course, the system 20 may have other configurations without departing from the spirit and nature of the present invention.

The system 20 may obviously be part of a production line.

Figure 3:
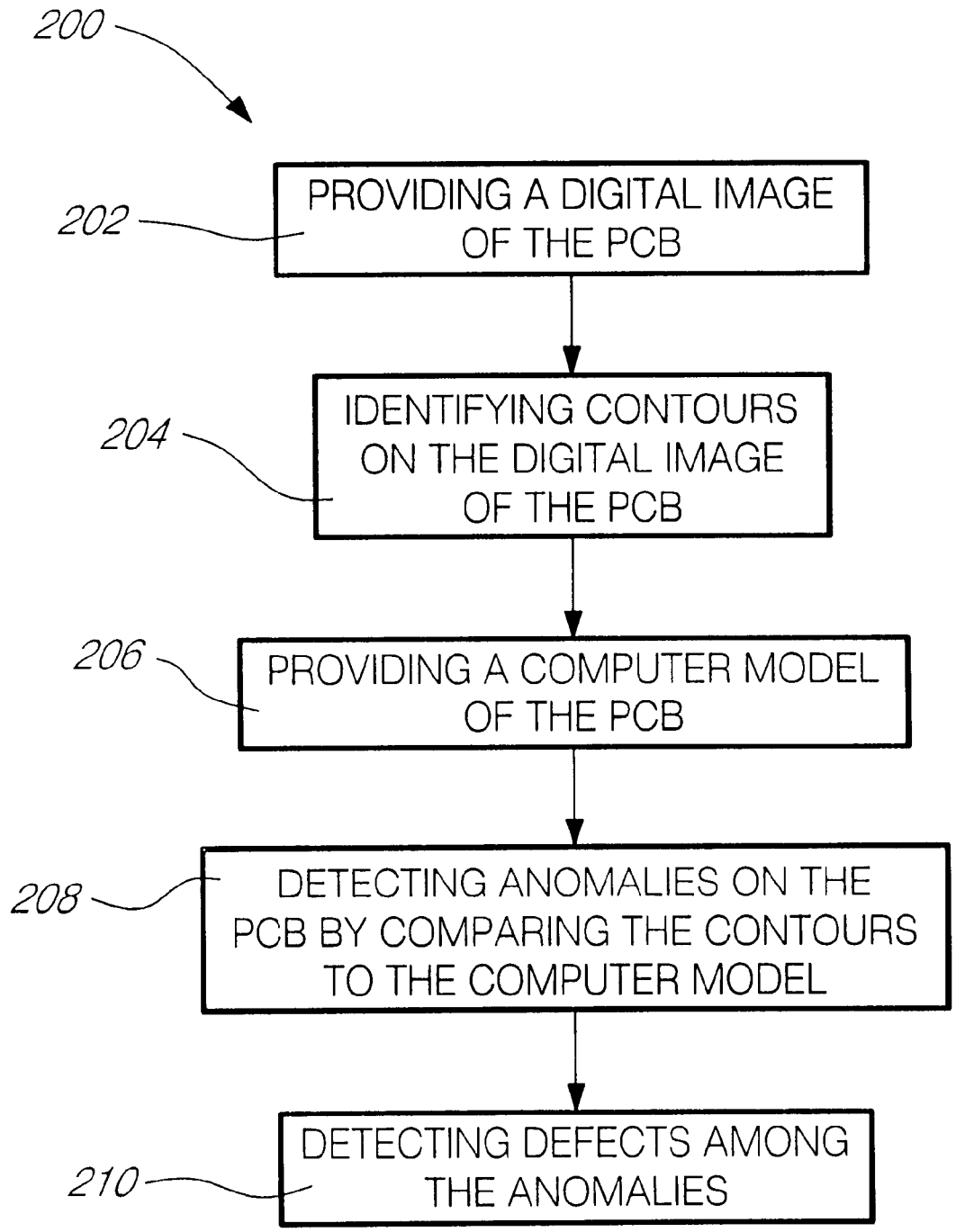
FIG. 3 is a flow chart of a method for detecting surface defects on a PCB according to an embodiment of the present invention.

Turning now to FIG. 3, a method 200 for detecting surface defects on a PCB or on another electronic circuit, according to an embodiment of the present invention, will now be described in more detail.

In step 202, a digital image of the PCB is provided to the computer 22. The image is advantageously in the form of a bitmap having grey levels. The number of levels of grey may vary according to the precision required. According to a most preferred embodiment of the present invention, the system 20 produces and analyses digital images having 256 grey levels. Alternatively, the initial image may have other formats and a conversion step may then be added to provide a bitmap image.

Figure 4:
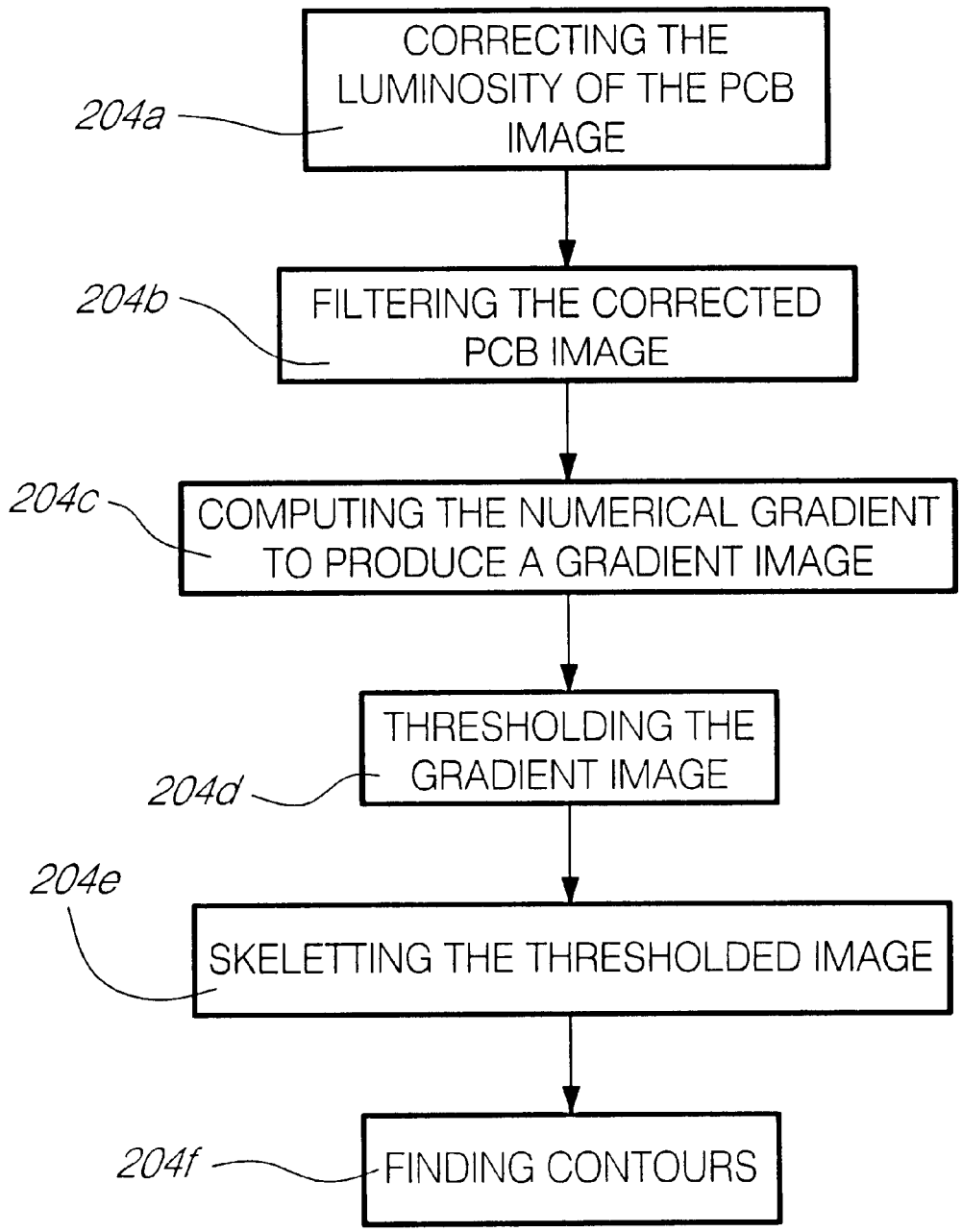
FIG. 4 is a flow chart of the contour-identifying step of FIG. 3.

In step 204, contours are identified on the PCB image. Step 204 produces an Actual Contour Chart (ACC) which is a representation of contours on the PCB image. As will be explained hereinbelow, the positions of the contours are computed at a greater resolution than the resolution of the PCB image as taken by the system 20. Step 204 is summarized in FIG. 4.

In sub-step 204a (FIG. 4), the luminosity of the PCB image is corrected. More specifically, the luminosity (pixel intensity) of the image is advantageously normalized using the following equation:

$$lum = 256 \times (lum - LUM\_MIN)/(LUM\_MAX - LUM\_MIN) \quad (1)$$

where
- lum is the luminosity at each pixel of the image;
- LUM_MIN is the average luminosity in the darkest region of the image; and
- LUM_MAX is the average luminosity in the brightness region of the image.

The above equation allows for distribution of the pixel intensity between LUM_MIN and LUM_MAX so as to cover all the 256 grey levels.

Obviously, the above equation may be corrected according to the number of grey levels of the image. Other normalization equations may also be used.

Although sub-step 204a is optional, it has been found to be advantageous to correct the luminosity to increase the efficiency of the thresholding sub-step (204d).

It is believed to be within the reach of a person skilled in the art to conceive an algorithm to determine the darkest and brightness region.

In the optional sub-step 204b, the PCB image is filtered so as to reduce noise caused by the numerization of the image. The following gaussian filter is advantageously applied on a 3 by 3 pixel window (eight-connected window):

$$\begin{matrix} 1 & 2 & 1 \\ 2 & 4 & 2 \\ 1 & 2 & 1 \end{matrix}$$

The gaussian filter may be applied on a pixel window having another dimension. Other types of filter may also be used.

In sub-step 204c, the numerical gradient is computed on the eight-connected window using a conventional Prewitt method. Alternatively, another method may also be used. The intensity of the gradient is saved in a new image. Since the Prewitt method is believed to be well know in the art, it will not be described herein in more detail.

The gradient image is then compared to a predetermined threshold to identify pixels in regions of the image where the luminosity changes rapidly (sub-step 204d). These regions usually correspond to pixel tracks overlapping the contours in the image.

In sub-step 204e, a first approximation of the edges is computed by skeletization of the pixel tracks identified in sub-step 204d. Indeed, every edge on the image corresponds to a chain of connected pixels, each having at least one neighbour in an 8-connected window. The skeletization process allows rendering of the pixel chain to a track having one pixel wide. The results are advantageously saved in an image file ($ACC_{image}$) having the same dimension as the initial image but having only binary value, i.e. 1 for pixels belonging to an edge and 0 for the other pixels.

In the sub-step 204f, every chain of pixels of the $ACC_{image}$ is listed as co-ordinates of pixels that form the ACC. These co-ordinates are only first estimates of the real co-ordinates, as will be explained hereinbelow.

More precisely, the chain is followed in counter-clockwise direction and the co-ordinates of every consecutive pixel are saved in a file: the ACC. Therefore the ACC contains a series of vector, each representing the co-ordinates of one of the contours of the image.

Each contour is then analyzed pixel by pixel so as to estimate the position of the passage by zero on the second derivative, which has been found to be a reliable indication of the co-ordinates of an inflection point of the luminosity. The corresponding pixels are supposed to be part of contours since an inflection point in the luminosity profile is an indication of a transition between two materials.

More precisely, the process consists first in finding an estimate of the direction perpendicular to the contour at each pixel. This is achieved first by doing a line fit at the current pixel position, including on the same contour the 2 pixels before and the 2 pixels after. The line fit indicates the angle of the contour tangent at the pixel position. The perpendicular direction is obtained by adding 90 degrees. Then the luminosity profile which lies along that direction and which crosses the current pixel is extracted in the initial PCB image, as originally taken by the system 20. The second derivative is computed on the luminosity profile. The passage by zero of the second derivative corresponds to the inflection point of the luminosity profile. The co-ordinate of this point is saved in the ACC, replacing the first estimate of the co-ordinate.

Of course, other numerical method may also be used to find the estimate of the direction perpendicular to the contour at each pixel.

It is believed to be within the reach of a person skilled in the art to conceive other methods of extracting contours form the digital image of a PCB under inspection.

As will be explained in more detail in step 208, anomalies are detected on the PCB under inspection by comparing the contour positions saved in the ACC and in the $ACC_{image}$ with the contour positions as designed. Indeed, a contour or part of a contour is suspect on the ACC if its position is different from its designed position.

In step 206 of the method 200 (FIG. 3) a computer model of the PCB under inspection is then provided. The computer model advantageously includes a vectorial model, in the form of polygons, of every layer with contours of components. In addition to being an adequate representation of contours, polygons have been found to be an efficient model for comparison with the ACC, as will be described hereinbelow.

A conventional Gerber model of the PCB is advantageously converted in a vectorial model where every component on each layer is represented as a polygon. Indeed, even an element including circle arcs may be represented as an adequate vectorial model if arc edges are represented by short vertexes. Alternatively, of if a Gerber model of the PCB is not available, other multi-layer models of the PCB may also be used to extract the relevant information.

Before comparing the vectorial model of the PCB with the ACC and the $ACC_{image}$, transformations may be performed on the vectorial model so as to align the model with the image. Indeed, during fabrication of the PCB, the layers are conventionally applied at different moments by different machines and the alignment of the layers may slightly differ. It is then preferable to have a multi-layer model of the PCB and to realign the layers of the model according to the PCB under inspection thus yielding a better model of the PCB.

For every layer, predetermined points are selected as a reference for the alignment process. As can be better seen from FIG. 5, showing the model of a layer 32 and a PCB image 34, it has been found advantageous to select intersection 40 between horizontal 36 and vertical 38 segments as reference points. Obviously, regions of a layer not covered by elements from another layer provide more reliable reference points. It is to be noted that the PCB image 34 includes components, such as components 42 that are not present on the single layer model 32 since the PCB image 34 includes all the layers.

Once the list of reference points is established, the following transformation can be applied on every point of a layer to align it according to the reference points on the PCB image:

$$u = \frac{a_u \times x + b_u \times y + c_u}{dd \times x + ee \times y + 1} \quad (2)$$

$$v = \frac{a_v \times x + b_v \times y + c_v}{dd \times x + ee \times y + 1} \quad (3)$$

where (u,v) are the co-ordinates in the PCB image, (x,y) are the co-ordinates in the model of the layer, and $a_u$, $b_u$, $c_u$, dd and ee are coefficients that allow to compensate for rotation, translation, scale, and perspective between the PCB image and the model. These coefficients may be different for each layer.

The reference points are advantageously selected before the inspection of PCBs to minimize delays in computation.

Once all the layers of the model are aligned, they are all superimposed.

Since all layers of the model include a plurality of polygons, the superimposition of 2 layers consists in superimposing each polygon of the first layer with all the polygons from the second layer. If the model includes, for example, a third layer, the polygons from the third layer are superimposed with the new polygons resulting from the superimposition of the first two layers.

This superimposition process is illustrated in FIGS. 6a to 6c.

FIG. 6a shows a three-layer model including three polygons P1, P2 and P3, one on each layer. The superimposition consists in superimposing the polygon P3 (Pv3) on the results of the superimposition of the polygon P1 and P2.

The superimposition of P2 over P1 yield:

$$Pv1=P1-P2 \quad (4)$$

$$Pv2=P2. \quad (5)$$

After the superimposition of P2 over P1, P2 is intact while P1 must subtract the part of P2 that overlaps. The superimposition of P3 on the superimposition of P2 and P1 yields (see FIG. 6b):

$$Pv1 = P1 - P2 - P3 \qquad (6)$$

$$Pv2 = P2 - P3 \qquad (7)$$

$$Pv3 = P3. \qquad (8)$$

In some cases, the subtraction of 2 polygons produces independent polygons. Pv1 and Pv1 can be seen as lists of polygons. When there is more then one polygon by layer, P1, P2 and P3 can also be seen as lists of polygons.

The superimposition process allows pointing out overlapping regions. A polygon on an overlapping region must be updated after the superimposition of a new layer.

As can be better seen on FIG. 6c, O21 is the resulting polygon resulting from the intersection of P1 and P2 after the superimposition with the P3.

Again, since the intersection of two polygons or the difference between two polygons may yield more than one polygon, O21 must be interpreted here as a list of polygons. This list may include no polygon if no polygon overlaps between layers 1 and 2.

The superimposition process described above also allows keeping track of narrow regions, as will be described hereinbelow. An example of a narrow region is region T31 in FIG. 7a. Region T31 is extracted as follows.

As can be seen from FIG. 7b, the polygons P1 and P3 are dilated to yield D(Pv1) and D(P3). The intersection therebetween is then found to yield the polygon D31 that obviously includes the region that is to be extracted. The polygon O31 is dilated to yield D(O31) that is subtracted from D31 to yield the narrow region T31 (see FIG. 7c).

The operation illustrated in FIGS. 7a to 7c is summarized by the following equation:

$$T31 = (D(P3)\hat{\,}D(Pv1)) - D(O31) \qquad (9).$$

Here again, T31 can be seen as a list of polygons for the following two reasons: the intersection of two polygons may yield more than one polygon and D(O31) may also yield more than one polygon.

To summarize, the superimposition of the layers produces the following three results:

$$Pv_{k+1} = (Pv_k - P_{k+1}) \cup P_{k+1} \qquad (10),$$

the list of visible polygons;

$$O_{k+1} = (O_k - P_{k+1}) \cup (P_{k+1} \cap Pv_k) \qquad (11),$$

the list of polygons from overlapping regions; and $$T_{k+1} = (T_k - P_{k+1}) \cup ((D(P_{k+1}) \cap D(Pv_k)) - D(P_{k+1} \cap Pv_k)) \qquad (12),$$

the list of polygons from the narrow regions, with, $$T_1 = D(P_1) \cap D(P_1) \qquad (13); \text{ and}$$

$O_1$ is nul (empty).

The process is iterative, i.e. each new layer is superimposed to $PV_k$, $O_k$ and $T_k$ obtained by the superimposition of the previous layers. The k indicia indicates the number of layers that has been superimposed.

The operations performed on the lists of polygons are union, intersection, subtration and dilatation. The union (∪) consists in grouping in a single list two lists of polygons. The intersection (∩) between two lists consists in the intersections of every polygon from a first list with every polygon from a second list. Similarly, when two lists are subtrated, every polygon of the first list are subtracted to all polygons in the second list.

The list of visible polygons $Pv_k$ describes all contours that should appear on the PCB image. However, the list $Pv_k$, as described hereinabove, is not in a format appropriate to be rapidly compared with the ACC. Indeed, every point in the ACC should correspond with at least one polygon segment from $Pv_k$ to ensure rapid comparison.

Transforming the list $Pv_k$ so as to replace every polygon's vertex with the segment that it forms with the next vertex yields the Characteristic Contour Chart (CCC). The segments of the CCC are thus divided into a list of polygons, including the description of all their segments instead of the entire vertexes, as in the $Pv_k$ list. More specifically, every segment in the CCC is characterized by the equation of a line, the co-ordinates of the end points of the line, and a distance threshold allowed from the segment. Moreover, the CCC includes, for all polygons, a characterization of the rectangle that closely encloses the polygon. This rectangle is so dilated as to ensure that every point in the ACC that is not enclosed in the rectangle does not correspond to a polygon's segment.

Detection of Anomalies

Once the CCC is created, step 208 of the method 200 (see FIG. 3) consists in detecting anomalies on the PCB by comparing the contours in the ACC with the computer model that is now in the form of the CCC. More specifically, the anomalies are advantageously indexed and characterized in the following two charts:

ECC, the Excess Contour Chart, and

MCC, the Missing Contour Chart.

The first step in the detection of contours in excess is to find a segment in the CCC that corresponds to each point in the ACC. If a point is not sufficiently near any segment of the CCC, it is considered in excess and is saved in the ECC. The computed distance is compared to a pre-determined threshold. The format of the ECC is the same as the ACC; it is a list of contours, with each contour characterized by a list of connected points.

More precisely, for each point in the ACC:

the CCC is scanned until one of its listed rectangles encloses the point;

the corresponding polygon is scanned until a segment to which the point may correspond the point is found;

if no segment corresponds to the point, another polygon is scanned;

if a segment is detected, the process continues with the next point, but beginning advantageously with the same segment. Indeed, since the points forming a polygon are consecutive, the probability that the next point corresponds to the same segment is good;

a point not corresponding to any segment is indexed in the ECC. If the point is part of a consecutive series of points, it is recorded in the ECC as being part of this series.

For each contour of the ACC, the points are advantageously scanned in the same direction in the ACC and in the CCC.

Of course, other methods may be used to detect contours in excess in the ACC.

The detection of missing contours will now be described in more detail.

The detection of missing contours also implies the detection of contours that deviate too much from the positions of contours in the CCC. For high-density electronic circuits, the allowed deviation zone of a contour is relatively narrow. But since CCC is in a vectorial format, its resolution is not limited by the resolution of the image. Similarly, the ACC has a resolution 7 to 8 times the resolution of the image since the ACC has been compiled after the detection of contours with a sub-pixel resolution. This is advantageous since it allows detecting misplaced contours even when the maximal allowed deviation is narrow.

It is to be noted that the detection of missing contours is relatively not binding in terms of precision. The objective of the detection of the missing contour process is only to verify if a contour on the CCC is absent on the image of the PCB. Indeed, the contours that are present on the PCB image, but misplaced relative to the computer model, will be detected by the detection of the exceeding contour process and indexed on the ECC. Therefore, the detection of the missing contours can be achieved at the resolution of the image and can thus be done by comparing images.

To obtain the MCC, the contours on the CCC are first drawn on a binary image, the $CCC_{image}$, having the same resolution than the $ACC_{image}$. The comparison between the $CCC_{image}$ and the $ACC_{image}$, yielding the MCC, is summarized by the following equation:

$$MCC = D(ACC_{image}) \hat{\times} CCC_{image} \cap CCC_{image} \quad (15)$$

where $D(ACC_{image})$ is the $ACC_{image}$ after dilatation. The process of computing MCC is also summarized in FIG. 8.

The MCC and the ECC comprise region descriptions corresponding to anomalies in the PCB image. These regions are inspected in step 210 of the method 200 (see FIG. 3) to detect defects.

Inspection of Anomalies

Since an anomaly can generate more than one contour in the ECC, but each contour of the ECC corresponds to only one anomaly, each contour of the ECC is advantageously considered as an independent anomaly and inspected separately. The inspection process ends when all contours in the ECC have been inspected. The contours in the ECC which are found beyond predetermined manufacturing standards are advantageously indexed and characterized in a file.

This file may take many forms without departing from the spirit and nature of the present invention and includes, for example, defect position and dimension, as well as a description of the PCB inflected with such a defect.

The majority of defects that can be found on a PCB correspond to wrong width of elements printed on the PCB or incorrect spacing between these elements. Other anomalies, such as contaminants, grooves, and feathering can be problematic when the width of an element or the distance between two elements diverge too much from design specifications.

Defects among anomalies are thus detected when either one of the following two is beyond manufacturing standards: the width of an element having an anomaly on it, and the distance between two neighbouring elements, if the anomaly is not on an element. These two conditions are verified independently as will be explained next.

The verifications of these two conditions are very similar. Generally stated, in both cases, all the segments of the CCC that can be found in the neighbourhood of the anomaly are stored in a computer file in the form of a list that will be referred to herein as the Neighbour Segment List (NSL). For every segment near the anomaly, every other segment of the NSL that are opposed to the first segment are found. The distance between the first segment and all of these opposed segments is verified to assess if the distance is within design or manufacturing standards. Those standards are obviously predetermined and pre-stored in a computer file so as to be accessible by the computer 32.

The verification of the distance between two segments and the verification of the width therebetween only differs by the definition of what are considered the two opposed segments, as will be explained hereinbelow.

Figure 9:
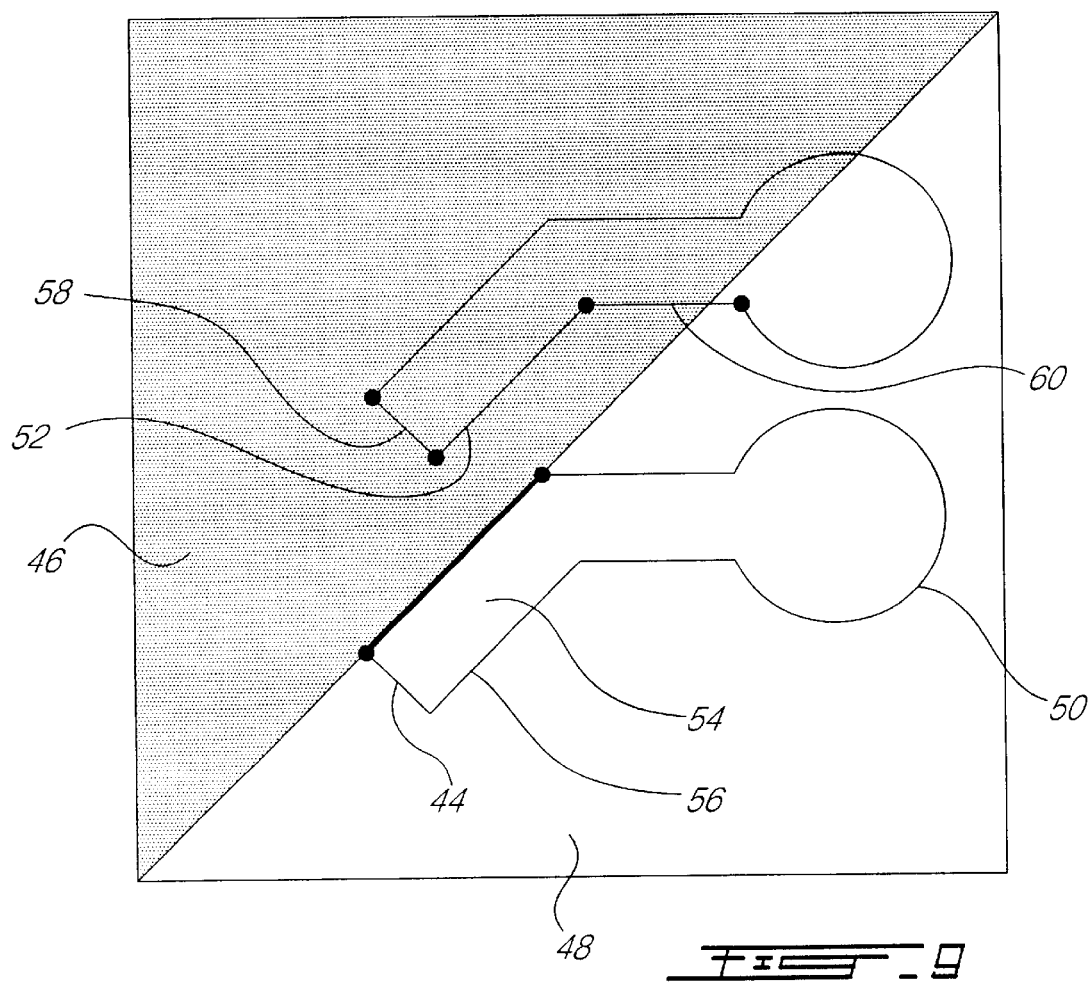
FIG. 9 is a schematic view illustrating the definition of two active half-plans in the step of detecting a defect among anomalies of FIG. 3.

As can be seen in FIG. 9, every segment of a contour, such as segment 44, can be interpreted as a frontier between 2 half planes 46 and 48. The plane 46, on the side of the segment 44 opposite the contour 50, is on the "exterior" side of the segment 44. The plane 48, on the same side of the segment 44 as the contour 50, is called the "material" side of the segment 44. The material side is set as "active" when the distance between segment 44 and the "opposed" segment 52 is verified.

The exterior side is active when the width of the track 54 between segment 44 and 56 is verified. Two segments are paired for analysis if they face each other and if they are in the same active plane. In the example of FIG. 9, segments 52, 58 and 60 are alternatively paired with segment 44.

The detection process used thresholds, advantageously expressed in percentages, thus providing a universal method that does not require that new thresholds for the width and distances be programmed for every new type of circuit. Of course the percentages are expressed according to the design values. For example, the threshold is set to 50%, when the distance between two segments is problematic if it is less than two times what has been designed.

Obviously, thresholds based on absolute values can also be used to verify the width between segments.

Different approaches may be chosen to determine the spacing between two segments, which will depend on the orientation of the segments and whether there are one or more anomalies between the two segments.

If an anomaly is detected between two parallel segments, the spacing between the two segments is simply defined as the distance between the two segments.

Figure 10:
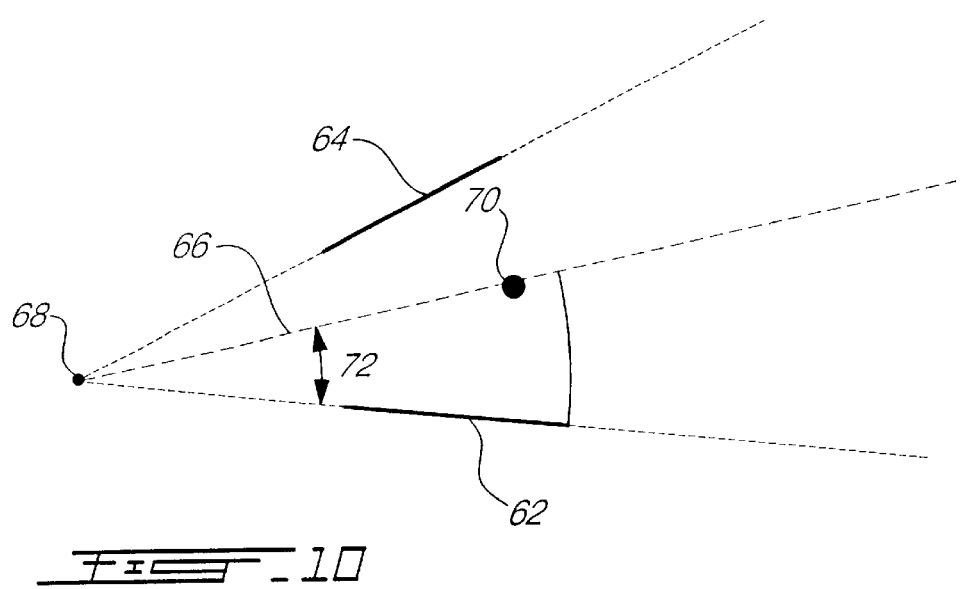
FIG. 10 is a schematic view illustrating the measurement of the distance between two segments when the segments are not parallel.

If the two segments 62 and 64 are not parallel (see FIG. 10) the spacing is arbitrarily defined as the angle between them. In such case the distance of a point to the reference segment 62 is measured as follow: the line 66 intersecting the intersection point 68 between the two segments and the point is measured. The distance between the point and the reference segment is defined as the angle 72 between the line 66 and the reference segment 62.

In both cases, the distance between each point of the anomaly and the reference segment (the opposed segment) is also computed. The maximum and minimum distance recorded define an interval that includes the anomaly. In the presence of an anomaly, the effective spacing between two segments is the spacing between the two segments minus the interval. The normalized spacing is the ratio between the effective spacing and the spacing between the two segments.

Figure 11:
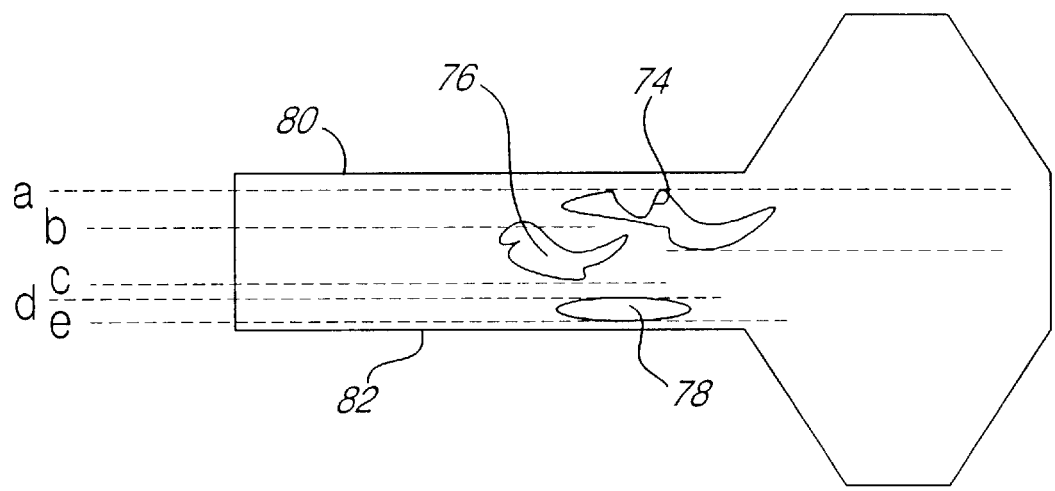
FIG. 11 is a schematic view illustrating the measurement of a cumulative interval between two parallel segments.

FIG. 11 illustrates an example of computation of spacing when a plurality of anomalies 74, 76 and 78 are detected between two segments 80 and 82.

In this case, intervals are computed for each anomaly. If the interval of more than one anomaly overlaps (see, for example, anomalies 74 and 76), these intervals are regrouped so as to form a single cumulative interval (a-c). The cumulative (a-c) and non-cumulative (d-e) intervals are added to yield the effective spacing. Again, the normalized spacing is the ratio between the effective spacing and the actual spacing between the two segments.

The verification of the spacing and of the widths are only performed in regions of the PCB image near an anomaly. The following description explains how these regions are determined. These regions will be referred to herein as Anomaly Analysis Regions (AAR).

Figure 12:
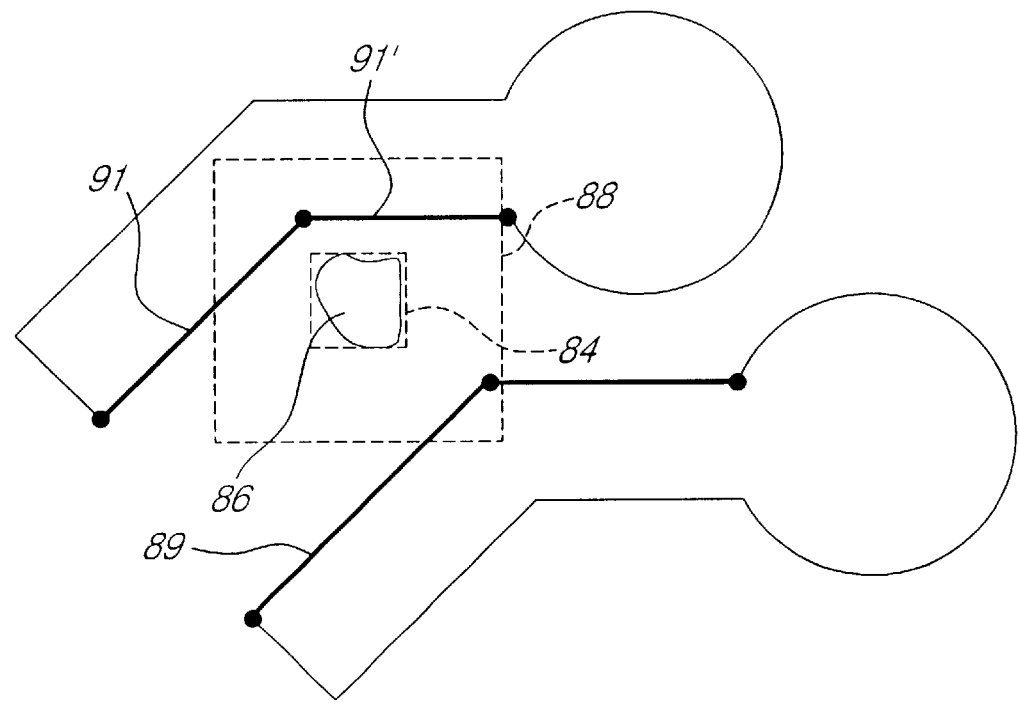
FIG. 12 is a schematic view illustrating the determination of an Anomaly Analysis Region (AAR)

Turning now to FIG. 12, the AAR is first determined as the rectangle 84 that encloses the anomaly 86. Well known algorithms can be used to determine such rectangle, knowing the co-ordinates of points forming the contour of the anomaly 86.

The rectangle 84 is then dilated by a Dilatation Factor (DF) defined by:

$$DF = \frac{1 + \% \ res}{1 - \% \ res} \quad (14),$$

where % res is a predetermined threshold on the normalized spacing or on the normalized width to yield the effective AAR 88.

Elements that are out of the region enclosed in the rectangle 88 are advantageously not considered for further analysis since it is presumed that they cannot cause a defect in combination with the anomaly 86. However, all segments 89-91 and 89-91' which are paired as described hereinabove, and which are in the AAR 88, are inspected for defects.

The AAR is advantageously determined for each anomaly when an anomaly is detected in step 208 (see FIG. 3) and is saved in the ECC.

If the AAR of a second anomaly is overlapping the AAR of a first anomaly, then it is assumed that the combination of these two anomalies can cause a defect. When an anomaly is inspected for defects, verification is thus done as if its AAR does not overlap the AAR of other anomalies. If it does, a new rectangle is created that encloses all the anomalies involved. The new rectangle is dilated to yield a new AAR and this last process is repeated until the new AAR does not overlap any other AAR. Again, in this AAR, all pairs of segments are verified for defects.

Since an AAR may include more then one anomaly or may be relatively important in size, a test may be performed to verify if each anomaly is located in the inter-space between two segments. The following two rules are advantageously implemented to perform the test.

The first condition implies that the rectangle defining the AAR should overlap the two active half planes of the two paired segments.

The second condition implies that the two segments should be sufficiently close. More specifically, the following criterion is used: the sum of the distances of the anomaly between the first and second segment should be less than half the maximum distance therebetween. The maximum distance between the two segments is saved and will be referred to herein as dsegmax. Although such criterion has been found to yield good results, other criterion can also be used to determine if two segments are sufficiently close to be inspected.

When the first and second conditions are satisfied, the anomaly is considered in the inter-space between the two segments and is considered when the pair of opposed segments are inspected for defects.

Turning to FIGS. 13a, 13b and 13c, a method 300 to determine if an anomaly causes a defect by violating the allowed width or spacing will now be described.

As will be discussed hereinbelow, two additional inspections will additionally be performed in the case of regions of narrow space and overlapping regions.

The anomalies are advantageously divided into two groups: anomalies that are on an element which can cause a width defect, and anomalies that are not on an element but which can cause spacing defect.

Anomalies that are on an element are relatively easily selected. Indeed, every contour on the ECC corresponds to a series of consecutive points. A contour of the ECC overlapping a contour of the CCC would then be broken in two. In relation thereto, if any point of a contour of the ECC is on an element, all the points of the contour are considered on this element. If only one point of an ECC contour is not on an element, then the contour is not considered on the element. Verifying only one point of every contour on the ECC therefore allows discriminating anomalies in two groups that are referred to herein as $ECC_{spacing}$ and $ECC_{width}$. The method 300 is used independently on the two groups.

Since the differences between the application of the method 300 on each of the two groups are very similar, and for concision purposes, the method 300 will be described by referring to the overall ECC.

The first step 302 is to take the next non-inspected anomaly listed in the $ECC_{width}$. Obviously, the first time the step 302 is performed, the next anomaly is the first one listed. This anomaly will now be referred to as the Current Anomaly (CA).

Step 304 consists in finding all anomalies in the ECC having its corresponding AAR overlapping the AAR of the CA.

In step 306, these anomalies are marked as inspected in the ECC lists and placed in a Current Anomalies List (CAL). The AAR is re-evaluated (step 306) as discussed hereinabove and steps 304 and 306 are repeated until no non-inspected anomalies have its AAR overlapping the new AAR.

In step 308, all the contours in the CCC enclosed in the AAR are listed in a new NSL.

In step 310, it is verified that all the segments in the NSL are marked as analyzed. If they are not, the next non-analyzed segment in the NSL becomes the Current Segment (CS), the CS is marked as analyzed in the NSL (step 311), and the process continues to step 316.

If all the segments in the NSL were marked as analyzed then, in step 312, verification is made that all anomalies in the ECC have been marked as inspected. If not, step 302 is repeated with the next anomaly. If so, the inspection of anomalies ends and the overall process is stopped (step 314).

Step 316 consists in verifying if the next non-analyzed segment of the NSL is opposed to the CS using the criteria described hereinabove. If such is the case, then the process continues with step 320. If this is not the case, and the end of the NSL has been reached (318), then step 310 is repeated. If not, step 316 is repeated.

In step 320, dsegmax is computed, as explained hereinabove, considering the CS and the segment opposed to the CS.

In step 322, verification is made as to whether the CAL includes another non-inspected anomaly. If such is the case, the next non-inspected anomaly in the CAL is set as the CA (step 324) and the process continues with step 326. If not, the method proceeds with step 330.

In step 326, if the ARR of the CA does not overlap the active half planes of both the CS and the segment opposed thereto, then step 322 is repeated. If so, then the method proceeds with step 328.

In step 328, the minimal distance to the CS (MD1) and to the segment opposed (MD2), and the maximal and minimal spacing (MAS and MIS) are computed for every point of the CA.

Among all detected anomalies, the ones that are in the inter-space of the two segments are determined (step 330). The test is as follows: if $$MD1+MD2>DSEGMAX*\%RES$$

then the anomaly is not considered in the inter-space of the two segments. The anomalies that are not in the inter-space are removed from the CAL (step 332).

If the CAL is empty, then the process returns to step 310 (step 334).

In step 336, the regions occupied by each anomaly are saved in a list of All Occupied Regions (AOR) that is advantageously in the form of intervals. The AOR list includes MAS and MIS for each anomaly. If two regions overlap, then their intervals are added.

In step 338, the normalized spacing is computed as discussed hereinabove. Indeed, the effective spacing between the CS and the segment opposed to it is computed. It is equal to the spacing between the two segments minus the sum of the intervals in the AOR. The normalized spacing is equal to the ratio of the effective spacing to the actual spacing between the two segments.

A defect is detected in step 340 if the nomalized spacing is inferior to the value % RES.

In step 342, the detected defect is characterized and saved in a defect list. More specifically, the anomalies and the two segments (CS and the segment opposed to CS) are saved. The process then returns to step 310.

Inspection of Regions of Narrow Space

The polygons $T_{k+1}$ from the narrow regions are also advantageously inspected for the following two reasons:

their dimension on the multi-layer model may be too small; and even if an inter-space between two elements on the model is correct, the corresponding region on the image may be incorrect.

Generally stated, two opposite segments in the list of polygons $T_{k+1}$ yields an inter-space having a width. Some of those inter-spaces correspond to a defect if the corresponding width is not within a predetermined threshold.

More specifically, a dimension on the multi-layer model that is too small can be indicative of an important alignment gap between the layers. This is detected by testing the inter-spaces with pre-determined criteria. For example, the spacing between two different materials may be verified to ensure that it is not inferior to a minimum spacing value as set, for example, by the manufacturers of the PCB. If it is less, then an alignment problem is detected between two layers.

It is possible that the detection of anomalies according to the method 300 may fail to detect a wrong spacing between two elements of a PCB.

Indeed, as was discussed hereinabove, the detection of anomalies is done within a predetermined allowance between the contours in the model and the contours as detected in the PCB image. However, the minimal dimension of a defect allowed in an inter-space depends on the dimension of the inter-space. For example, if the allowance on the contour position is 25% of the width on the model, and the minimal width of the region is 50% of the model's width, then the anomalies will not be detected by the algorithm 300.

Figure 14:
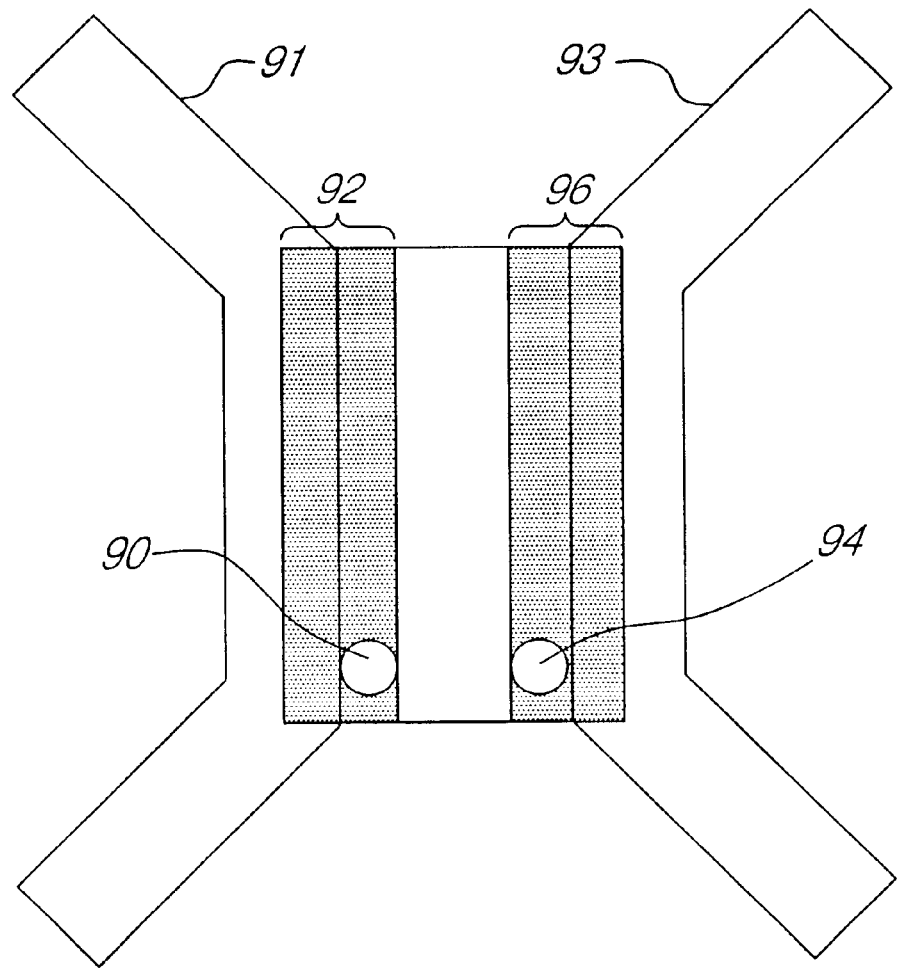
FIG. 14 is a schematic view illustrating defects in a narrow space region.

Turning now to FIG. 14, a first anomaly 90 can cause a deviation of a contour 91 within the tolerance margin and be at 25% of the nominal width 92 and so is a second anomaly 94 near the opposite contour 93. None of the two anomalies are detected by the method 300 since they are both within the tolerance margins 92 and 96. However, the combination of the two anomalies contributes to narrowing the inter-space by 50% of its nominal width. This however corresponds to a defect.

Figure 15:
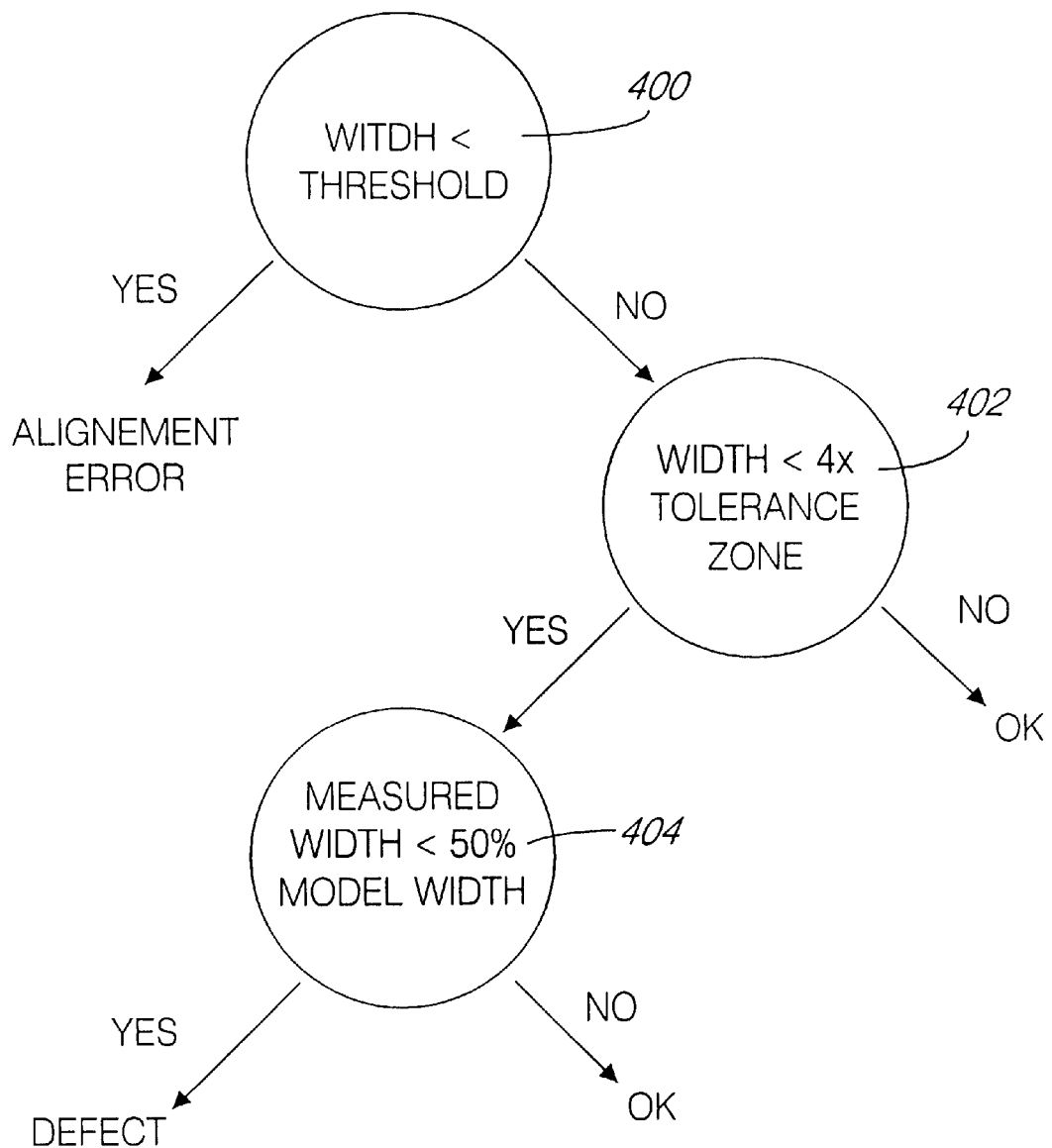
FIG. 15 is a decision tree to detect defects in a narrow space region.

The following criteria, illustrated in FIG. 15, are set according to the method of the present invention to detect a defect in a region of narrow space (inter-space).

In step 400, if the computed width of the inter-space is inferior to the threshold, as specified for example by the manufacturer, an alignment error of the layers is detected.

If not, and the width is inferior to four times the tolerance margin on the contour position (step 402), then a defect may be present and the width of the inter-space is measured on the PCB image.

If the measured width is inferior to 50% of the width on the model (step 404), then the region between the elements (inter-space) is incorrect and a defect is detected.

Figure 16:
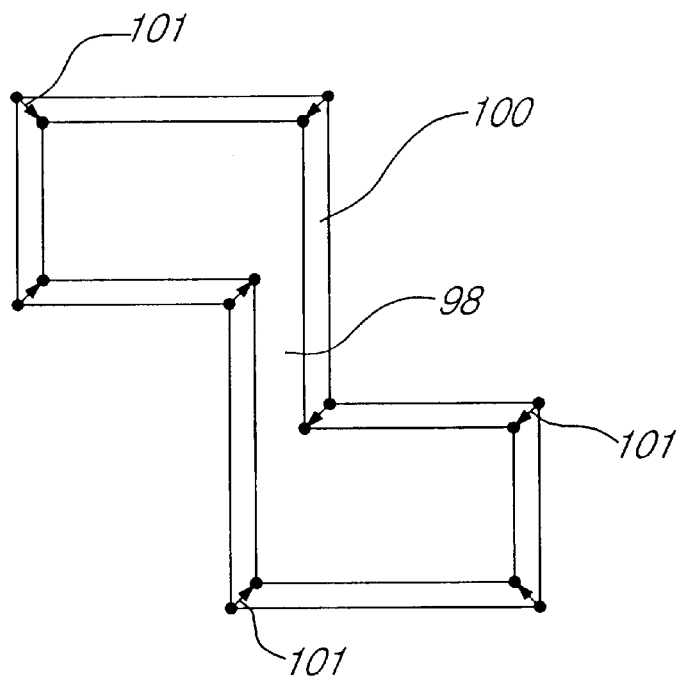
FIG. 16 is a schematic view of a polygon from a vectorial model, illustrating the erosion process.
Figure 17:
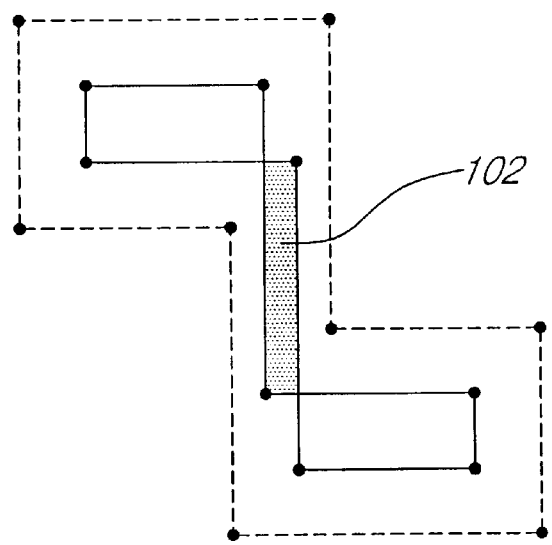
FIG. 17 is a schematic view of the polygon of FIG. 16 after the erosion process.

As it is illustrated in FIGS. 16 and 17, the measurement of the inter-space 98 on the vectorial model is advantageously done by gradually narrowing the polygon 100 (see arrows 101) until segments of the polygon cross (see 102 in FIG. 17). This process is called erosion.

The rate of erosion is an indication of the width of the inter-space 98. For example, the erosion rate is advantageously set high until a crossing occurs 102. Then, the rate is lowered to dilate the polygon 100. Then the rate is lowered again to restart the erosion until another crossing occurs. The process is repeated until the erosion rate is equal or inferior to the required resolution. The rate is expressed in fractional number of pixels since the resolution is advantageously in the order of the sub-pixel as it has been discussed hereinabove.

The measurement of the inter-space on the image is advantageously done by the extraction of the contours that mark off the inter-space. It is to be noted that these contours do not necessarily correspond to the same element or do not necessarily produce closed contours. The contours are then closed to form the vertex of a polygon. The method discussed hereinabove for the erosion of the polygon in the vectorial model is used to measure the width of the contour.

Other methods can also be used to measure the inter-space both on the vectorial model and on the image, without departing from the spirit of the present invention.

Of course, other thresholds or criteria may also be set to detect defects in narrow regions.

Inspection of Overlapping Regions

The overlapping regions obtained by equation (11) are inspected for the same two reasons stated in the prior section.

However, in the case of the overlapping regions, another problem may arise: one or more contours of a layer may be hidden on the PCB image by an overlapping layer. In this case, two possibilities exist.

A portion of a segment may be visible, allowing the extrapolation of the contour on the superior layer. Otherwise, only visible contours are detected.

Since, the detection of defects in overlapping regions is generally based on the same criteria described in FIG. 15, it will not be described herein in more detail.

Defects that are caused by narrow regions or by overlapping regions are advantageously characterized and saved in a file for further analysis. This file may be the same as the one used to store and characterize the other detected defects.

Although the present invention has been described hereinabove by way of preferred embodiments thereof, it can be modified, without departing from the spirit and nature of the subject invention as defined in the appended claims.

What is claimed is:

1. A method for detecting surface defects on a Printed Circuit Board (PCB) having at least one layer including components, said method comprising:
   providing a digital image of the PCB;
   identifying edges on the PCB image;
   providing a computer model for each component on the at least one layer of the PCB, the computer model of each component on the at least one layer including segments;
   detecting anomalies on the PCB image by comparing identified edges to the computer model; and
   for each detected anomaly, determining if the detected anomaly corresponds to a surface defect;
   wherein said edges identifying step includes:
      computing a numerical gradient on the PCB image to yield a gradient image;
      thresholding the gradient image to yield a thresholded image;
      skeletting the thresholded image; and
      finding edges on the skeletted image;
      thereby yielding at least one chain of pixels, and wherein said edges identifying step further includes:
         saving each of the at least one chain of pixels of the skeletted image as a vector of pixel co-ordinates;
         using the pixel co-ordinates to estimate a second derivative of the at least one chain of pixels; and
         estimating co-ordinates of a passage by zero of the second derivatives;
         whereby, the passage by zero corresponds to edges.

2. The method as recited in claim 1, further comprising correcting a luminosity of the PCB image to yield a corrected image.

3. The method as recited in claim 2, further comprising filtering the corrected image.

4. A method for detecting surface defects on a Printed Circuit Board (PCB) having at least one layer including components, said method comprising:
   providing a digital image of the PCB;
   identifying edges on the PCB image;
   providing a computer model for each component on the at least one layer of the PCB, the computer model of each component on the at least one layer including segments, each of the at least one layer of the computer model being aligned with the PCB image and aligned layers being superimposed;
   detecting anomalies on the PCB image by comparing identified edges to the computer model; and
   for each detected anomaly, determining if the detected anomaly corresponds to a surface defect,
   wherein the computer model is a vectorial model including a polygon representation of every component on each of the at least one layer; the polygon including at least one segment; the at least one layer of the computer model being superimposed by superimposing each polygon from a first layer with each polygon from a second layer.

5. The method as recited in claim 4, wherein said superimposition is done using the following iterative formula for each layer:

$$Pv_{k+1} = (Pv_k - P_{k+1}) \cup P_{K+1}$$

where
   $P_k$ is a list of vectorial representations of segments in a current layer;
   $Pv_k$ is a list of vectorial representations of segments produced by a superimposition of previous layers;
   $Pv_{k+1}$ is a list of vectorial representations of segments produced by the superimposition of a layer with the superimposition of the previous layers; and $$Pv_1 = P_1.$$

6. The method as recited in claim 4, wherein said anomalies detecting step includes determining, for each layer k of the computer model, a list of polygons $T_k$, located in narrow regions of the layer k, using the following iterative formula:

$$T_{k+1} = (T_k - P_{k+1}) \cup ((D(P_{k+1}) \cap D(Pv_k)) - D(P_{k+1} \cap Pv_k))$$

where
   $P_{k+1}$ is a list of vectorial representations of polygons in the previous layer;
   $Pv_k$ is a list of vectorial representations of polygons produced by the superimposition of the previous layers;
   $Pv_{k+1}$ is a list of vectorial representations of polygons produced by the superimposition of a layer with the superimposition of the current layer;
   D is a function that causes the dilatation of all polygons in a list of polygons; and $$T_1 = D(P_1) \cap D(P_1);$$

two opposite segments in the list of polygons yielding an inter-space having a width; wherein each of the inter-spaces corresponding to a defect of the corresponding width is not within a predetermined threshold.

7. The method as recited in claim 6, wherein the width of the inter-space is determined by erosion of each of the polygons.

8. The method as recited in claim 4, wherein said anomalies detecting step includes determining, for each of the at least one layer k, a list of polygons $O_k$ in overlapping regions on the PCB's computer model using the following iterative formula:

$$O_{k+1} = (O_k - P_{k+1}) \cup (P_{k+1} \cap Pv_k)$$

where:

$P_{k+1}$ is a list of vectorial representations of polygons in the previous layer;

$Pv_k$ is a list of vectorial representations of polygons produced by the superimposition of the previous layers; and $O_1$ is nul;

two opposite segments in the list of polygons yielding an inter-space having a width; wherein each of the inter-spaces corresponding to a defect of the corresponding width is not within a predetermined threshold.

9. A method for detecting surface defects on a Printed Circuit Board (PCB) having at least one layer including components, said method comprising:

providing a digital image of the PCB;

identifying edges on the PCB image;

providing a computer model for each component on the at least one layer of the PCB, the computer model including contours of each component, and for each contour, a model of a rectangle enclosing the contour;

detecting anomalies on the PCB image by comparing identified edges to the computer model, wherein: a) for each pixel of the PCB image, verifying if a contour among said contours of each component has its corresponding rectangle enclosing said pixel; if not, considering said pixel part of an anomaly; if so, b) verifying if said pixel is part of said contour having its corresponding rectangle enclosing said pixel; if not, considering said pixel part of an anomaly; and for each detected anomaly, determining if the detected anomaly corresponds to a surface defect.

10. A method for detecting surface defects on a Printed Circuit Board (PCB) having at least one layer including components, said method comprising:

providing a digital image of the PCB;

identifying edges on the PCB image;

providing a computer model for each component on the at least one layer of the PCB, the computer model of each component on the at least one layer including segments;

detecting anomalies on the PCB image by comparing identified edges to the computer model; and for each detected anomaly, determining if the detected anomaly corresponds to a surface defect;

wherein said anomalies detecting step includes using the computer model to create an image of the computer model and comparing the PCB image with the image of the computer model and further includes detecting edges in the PCB image that are in excess relative to the segments in the computer model; for each detected anomaly, determining defects by a) determining a first segment in the computer model that is positioned within a predetermined distance of the detected anomaly; b) for each segment opposite the first segment, determining if a distance between the first segment and the opposite segment is within a predetermined threshold.

11. The method as recited in claim 10, wherein the distance between the first segment and the opposite segment is computed as an effective spacing therebetween when more than one anomaly is located between the first segment and the opposite segment.

12. The method as recited in claim 11, wherein the anomalies include overlapping and non-overlapping anomalies; the effective spacing is computed as a sum of intervals between all non-overlapping anomalies and regrouped overlapping anomalies.

13. The method as recited in claim 10, wherein the predetermined distance is defined by a rectangle that encloses the detected anomaly.

14. The method as recited in claim 13, wherein the enclosing rectangle is dilated.

15. The method as recited in claim 13, further including verifying if the enclosing rectangle encloses another anomaly and, if so, redefining a rectangle that encloses the another anomaly.

16. The method as recited in claim 15, wherein said rectangle redefining step is iterative.

17. The method as recited in claim 10, wherein the threshold is in a form of a ratio.

* * * * *